United States Patent Office 3,536,599
Patented Oct. 27, 1970

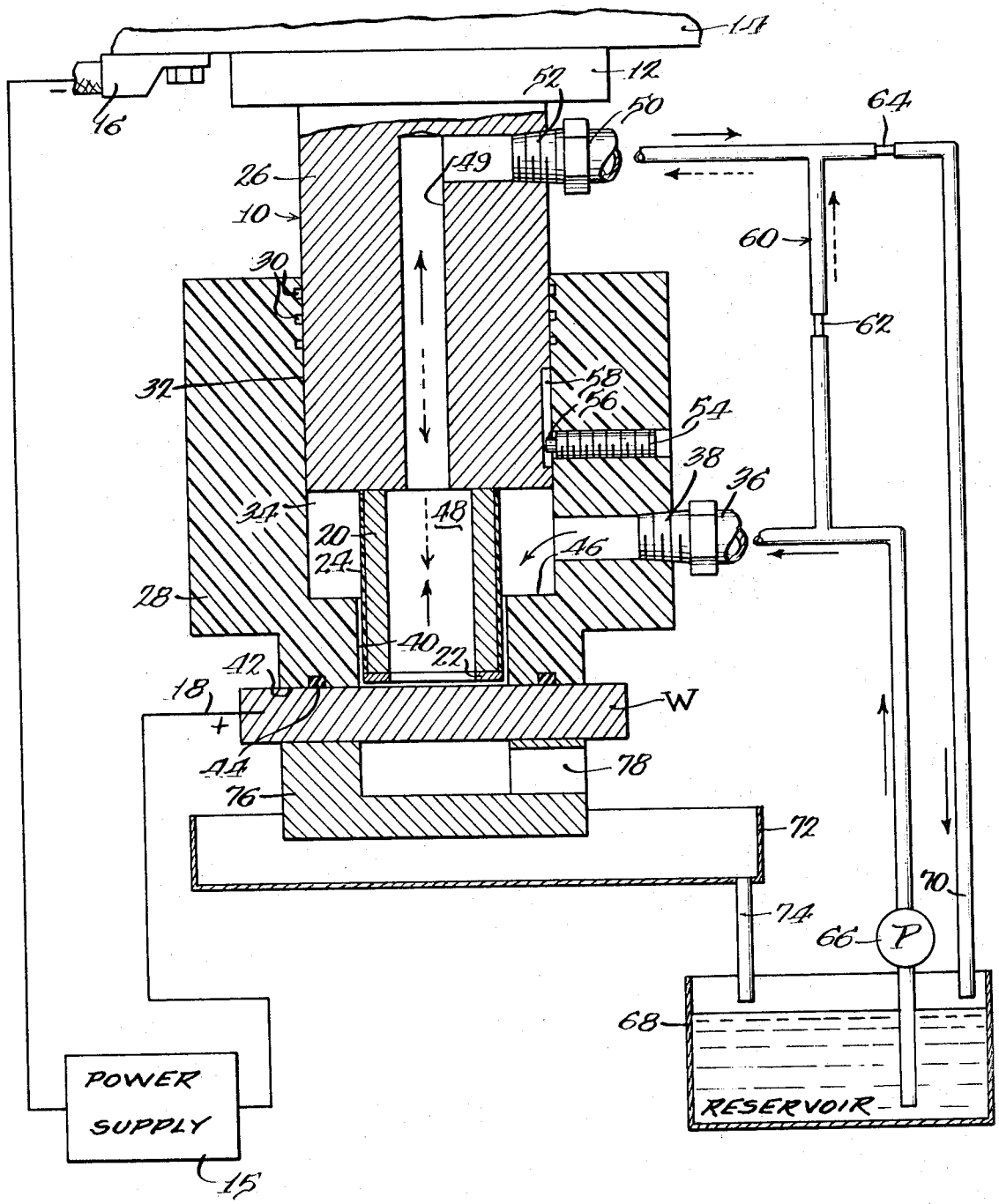

3,536,599
ELECTROLYTIC CAVITY SINKING APPARATUS AND METHOD WITH PRESSURE MEANS FOR FORCING A MACHINED SLUG FROM THE ELECTRODE
Lynn A. Williams, Winnetka, Ill., assignor to Anocut Engineering Company, Elk Grove Village, Ill., a corporation of Illinois
Filed Nov. 9, 1967, Ser. No. 682,734
Int. Cl. B23p 1/12
U.S. Cl. 204—143        8 Claims

ABSTRACT OF THE DISCLOSURE

The electrolytic through hole forming apparatus includes a fixture for mounting the workpiece in which the hole is to be formed, a hollow electrode having a working tip of electrically conductive material, a powered ram head mounting the electrode for movement toward the workpiece, an electrolyzing current power supply connected to the electrode and to the workpiece so as to make the workpiece anodic and the electrode cathodic and capable of delivering a low voltage (5 to 25 volts), high density (100 to 8000 amperes per square inch) direct current, and a source of electrolyte including a pump for delivering electrolyte around the exterior of the electrode at a high velocity through the work gap between the electrode and the workpiece to exit through the hollow electrode and at a pressure of about 150 to 200 pounds per square inch at the entry to the work gap. The electrolyte inlet and exit lines are interconnected. A restriction is placed in the interconnecting line, and a similar restriction is placed in the exit line downstream from the interconnecting line. The restriction in the exit line is such that it creates a back pressure about half that of the inlet pressure from the supply pump, and the restriction in the interconnecting line is sufficient to create a pressure downstream thereof of about one atmosphere. At breakthrough of the electrode at the exit side of the workpiece electrolyte flows into a chamber at atmospheric pressure in the support fixture. The pressure drops in the exit line eventually to a value such that the electrolyte flowing in the interconnecting line gives a reverse flow which dumps electrolyte from the pump into the normal exit line under an inlet pressure which is sufficient to keep the slug formed during sinking the hole from sticking to the electrode when the breakthrough has been completed.

CROSS REFERENCES TO RELATED PATENTS

Reference should be had to the patent of Lynn A. Williams, No. 3,085,895, dated Oct. 16, 1962, to the patent of Joseph L. Bender and Lynn A. Williams, No. 3,214,360, dated Oct. 26, 1965, to the patent of Lynn A. Williams, No. 3,275,543, dated Sept. 27, 1966, and to the patent of Lynn A. Williams and Leonard Malkowski, No. A,287,246, dated Nov. 22, 1966.

BACKGROUND OF THE INVENTION

The present invention is concerned with the problems encountered when the electrode breaks through the workpiece at its exit face and with the substantial elimination of the troublesome sticking of workpiece material to the electrode which results in shorting on subsequent operation.

In general, apparatus of the type disclosed in the aforesaid Pat. Nos. 3,085,895 and 3,214,360 includes a fixture for securely mounting the workpiece, a hollow electrode having a working tip of electrically conductive material, a powered ram head mounting the electrode for movement toward the workpiece, an electrolyzing current power supply connected to the electrode and to the workpiece so as to make the workpiece anodic and the electrode cathodic and capable of delivering a low voltage, high density direct current, and a source of electrolyte capable of delivering electrolyte at a high velocity and high pressure to the work gap between the electrode and the workpiece and at a pressure of about 150 to 200 pounds per square inch at the entry to the work gap between the electrode working face and the adjacent workpiece surface.

In connection with through bores or holes being formed in a workpiece, electrolyte is pumped to the workpiece through the bore or around the exterior of the electrode, and as the electrode approaches the remote or exit side of the workpiece, it will usually break through in some one area before it breaks through all the way around the cavity. This is due to the almost unavoidable irregularities in the surface of the workpiece. When this occurs, the electrolyte finds its way out through the opening at the exit side of the workpiece instead of turning back over the working tip of the electrode to return along its axis to the entry surface of the workpiece or through the hollow bore. This is detected by observing a jet of electrolyte squirting through an opening on the exit surface of the workpiece.

One of the means of preventing this is disclosed in Pat. No. 3,058,895 and consists of a dummy piece fastened to the exit surface of the workpiece by an adhesive, such as water glass. In another form a backup material of soft rubber is used. It is obvious that these arrangements involve some inconvenience and in some cases are very difficult to use because the exit surface of the workpiece may lead into a more or less closed chamber which is not readily accessible. Unless some form of backup device is used and unless the electrode is advanced so that its working tip has pased completely through the workpiece and into the backup device, there will be in the cavity adjacent the exit surfaces of the workpiece a sharp inturned lip of work material.

In Pat. No. 3,214,360, an arrangement is disclosed to prevent irregular breakthroughs consisting of a backup device having a shallow recess with a bleed hole on the rear side in order to maintain a pressure differential which urges the slug of workpiece material downwardly towards the bottom of the recess. When the slug of material breaks away from the workpiece, it is urged by the pressure differential to close the bleed hole. Thus, the slug moves out of the way so as to permit a slight additional advance of the electrode to clear away any inturned lip of the workpiece at the exit surface of the work material.

In general, the present invention provides control of the electrolyte in the inlet and exit lines. The inlet and exit lines are interconnected. A restriction is placed in this interconnecting line and a similar restriction is placed downstream from the interconnecting line in the exit line. The restriction in the exit line is such that it creates a back pressure roughly half that of the inlet pressure from the supply pump. The restriction in the interconnecting line is sufficient to create a pressure downstream thereof of about one atmosphere, although this value is not critical, so that while there may be come leakage flow through the restriction during normal operation, it is insignificant.

At breakthrough the electrolyte flows into the support fixture which has a chamber in it from which there is an electrolyte exit leading directly back to the reservoir at atmosphere. Therefore, there is a pressure drop in the return flow of electrolyte and eventually this pressure drop is sufficient so that the electrolyte flowing in the interconnection gives a reverse flow and the reverse flow therefore dumps electrolyte from the pump into the normal exit line under an inlet pressure which is sufficient to keep the slug from sticking to the electrode when the breakthrough has been completed.

An object of the present invention is therefore to provide a new and improved apparatus and method for feeding electrolyte and advancing an electrode which will overcome the difficulties encountered in breakthrough of the electrode at the exit side of a workpiece.

Another object is to provide new and improved electrolyte supply apparatus and method which cooperates with the electrode at breakthrough to prevent sticking of workpiece material to the electrode.

Another object is to provide new and improved electrolytic cavity sinking apparatus and method which is simple, and has a minimum number of components to achieve a uniform hole sinking capability.

Another object is to provide new and improved electrolytic machining apparatus and method which restricts the flow of electrolyte to insure uniform hole sinking capability.

DESCRIPTION OF THE DRAWING FIGURES

Other objects and advantages will become apparent from the following description taken in conjunction with the accompanying drawing, wherein The single figure is a schematic view, partially in section, of a portion of an electrolytic cavity sinking apparatus illustrating the present invention.

SPECIFIC DESCRIPTION

In the drawing there is shown an electrode structure indicated generally by the reference character 10, which is fastened by a flange 12 to a ram plate 14. The ram plate is mounted on the forward end of a powered ram structure and is insulated therefrom by an insulating block. The ram structure includes a movable member powered from a positively driven screw (not shown) which will advance the electrode 10 at constant speed into the work W as shown and described in the patent No. 3,287,246. The machine includes an electrolyzing current power supply 15 the output of which is connected by a cable or conductor 16 to the ram plate 14 and electrode 10, and a conductor 18 to the work through the table and work holder (not shown) which normally supports the workpiece W in place. The power supply 15 is capable of delivering a low voltage, high density direct current in a sense to make the electrode 10 negative and the workpiece W positive.

The electrode structure 10 includes the electrode proper at 20 having a working tip 22 with a laterally projecting flange or tip. The shank or body is coated at least on its exterior surfaces with an insulating material 24 which may be a vitreous enamel or an epoxy resin. If the electrode is of any substantial diameter, the interior will also be provided with a coating of insulation similar to the insulation 24.

The electrode 20 is made integral with or commonly mounted in an enlarged tubular piston like portion 26 which serves as the electrode mount and which in turn is secured to the flange 12. Mounted on the electrode mount 26 is a bushing 28 which may be made of a plastic material impervious to chemical deterioration or damage by heat. Feed bushing 28 should be made of an insulating material such as Teflon resin. The feed bushing 28 is mounted so that it slides easily over the electrode mount 26 and has a clearance therewith in the order of .002 inch. To prevent excessive leakage of electrolyte a number of square-bottomed annular grooves 30 are cut into the external surface of the electrode mount 26 and they provide a labyrinth seal to prevent excessive leakage of electrolyte between the feed bushing 28 and the mount 26.

The feed bushing is made in such a way that at the inner end of its cylindrical bore 32 there is provided an annular chamber 34 surrounding the electrode 20 into which the electrolyte is pumped under presure through a supply line 36 and a fitting 38.

The bushing 28 is formed with a bore 40 communicating with the chamber 34 at its exit end which is just large enough to permit being slipped over the electrode 20 so that there is a clearance of several thousandths of an inch between the bore 40 of the bushing and the shank of the electrode 20, thereby permitting the easy and adequate flow of electrolyte along the side walls of the electrode and down over the working tip 22. At its exit end the guide bushing 28 provides a sealing shoulder 42 having an O-ring 44 in a groove therein to seal against the entry surface of the workpiece W.

The feed bushing 28 is more or less permanently mounted on the electrode mount 26 and the entire assembly is then brought into close proximity with the workpiece W with the bushing extending so that its sealing shoulder 42 touches the workpiece. The working tip 22 of the electrode 20 is recessed within the bushing 28. As electrolyte is pumped through the flexible conduit 36 and fitting 38 into the chamber 34, the effect is to create a hydrostatic force on the surface 46 of the chamber 34 which is opposite the shoulder 42, thus urging the bushing into tight sealing engagement with the entry surface of the workpiece. Thus, the effect of any increase in work pressure from the ram structure or the entering electrolyte is to increase sealing pressure, thereby completely eliminating the need for any mechanical clamp or the like.

The electrolyte flows along the exterior surface of the electrode, through the space between the electrode 20 and the inner surface of the bore 40, through the working gap between the workpiece W and working tip 22, and back through bore 48 in the electrode 20. The electrolyte leaves the work gap through the bore 48 in the electrode and a communicating bore 49 in the electrode mount 26 to a return line 50 connected by a fitting 52 to the electrode mount 26.

A recessed screw 54 in the bushing 28 having a projection 56 engages a vertical channel 58 in the electrode mount 26 to control the range of relative vertical movement of the electrode mount 26 and the bushing 28 and to prevent relative rotation when the electrode has a shape other than round. The electrode 20 is restricted to movement within the bore 40. Moreover, at the other extreme of movement, the electrode mount 26 is incapable of closing the electrolyte inlet from fitting 38.

The electrolyte supply line 36 and the return line 50 are interconnected by a conduit 60 which has a restriction 62 therein. Also within return line 50 downstream from interconnecting line 60 is a restriction 64. A pump 66 supplies electrolyte from a reservoir 68 to the entry supply line 36 and suitable valves are used to control the pressure of the electrolyte at the entry to the work gap as shown in Pats. Nos. 3,058,895 and 3,275,543.

Beneath the workpiece W is a basin 72 which has return conduit 74 connected to the reservoir 68. Directly under the workpiece is a backstop 76 adapted to control the flow of electrolyte at breakthrough through an unrestricted exit port 78 which is open to the atmosphere and atmospheric pressure. The electrolyte flowing out through the port 78 dumps into the basin 72 and is returned to the reservoir 68.

In operation, the pump 66 supplies electrolyte through the supply line 36 into the annular chamber 34 between the electrode mount 26 and the bushing shoulder surface 46. Electrolyte then flows through the bore 40 between bushing 28 and the electrode 20 over the working tip 22 and into the exit passages 48 and 49. It will be appreciated that this arrangement maintains a solid moving column of liquid all the way around the working tip 22. The pressure is maintained in the exit passage by the restriction 62 in the interconnecting line 60 and the restriction 64 downstream from the interconnecting line 60 in the return conduit 50.

Thus, interconnecting line 60 connects the electrolyte in the entry line 36 and outlet line 50. Restriction 62 in the interconnecting line 60 and the similar restriction 64 downstream from the cross connection 60 in the exit line cooperate to control the flow of electrolyte. Restriction 64 which is in the exit line is such that it creates a back pressure varying from about one tenth to one half that of the inlet pressure from the supply pump 66. For example, pressures of 200 p.s.i. in the supply line 20 to 100 p.s.i. at the restriction 64 have been found to be satisfactory. The restriction 62 in the interconnecting line 60 is sufficient to create a pressure downstream thereof and ahead of the junction with the conduit 50 of about one atmosphere so that while there may be some leakage flow through the restriction 62 during normal operation, it is insignificant. Actually the pressure in the conduit portion 60 will be substantially that in the return conduit 50.

As the electrode 20 breaks through to the exit side of the workpiece W, electrolyte pours into the backstop 76 and out through unrestricted exit port 78 into the basin 72 and then into the reservoir 68 through the drain line 74. The breakthrough of the electrode through the workpiece is accompanied by a pressure drop in the electrode passage 48 and 49, and the return line 50. The pressure drops quickly to a level such that the electrolyte flowing in the interconnection 60 causes a reverse flow of electrolyte in the normal exit passages 48 and 49, under a very low inlet pressure. The reverse flow condition is shown by the broken arrows while the solid arrows indicate normal flow of the electrolyte. This is sufficient to keep the slug of workpiece material from sticking to the electrode 20 when the breakthrough has been completed. Under these circumstances, electrolyte is supplied to the work gap through both the entry bore 40 and around the electrode 20 and exit passage 48.

It should be noted that the reverse flow is the result of a difference in pressure, between the exit line, caused by restriction 64, to the unrestricted opening at the electrode tip. Electrolyte is supplied for reverse flow through the restriction 62 in the interconnecting line 60.

Restrictions 62 and 64 need not be separate and discrete elements. The conduits themselves may be sized to give the desired effect and in this respect they should be considered as restrictions here.

The arrangement just described ensures that at breakthrough all of the passages leading to the work gap between the workpiece W and the electrode working tip 22 are filled with electrolyte flowing to the work gap. The only effective outlet from the work gap in this condition is through the hole through the workpiece W. Electrolyte flowing in this manner provides a current path between the electrode working tip 22 and the side walls of the cavity being formed so that at the exit side of the workpiece the hole will have a clear and sharp eye with no inturned tip.

When in this specification I use the term low voltage, I mean a voltage in the range between about 5 volts and about 25 volts, preferably between 10 volts and 15 volts, and when I refer to high current density, I mean current densities in the range from about 100 amperes p.s.i. to 8,000 amperes p.s.i., preferably in the range from 500 amperes p.s.i. to 3,000 amperes p.s.i.

It is clear from the foregoing description that the objectives which were claimed for this invention at the offset of the specification are attained.

Various modifications may be made in the invention without departing from the spirit and scope thereof, and it is desired, therefore, that only such limitations shall be placed thereon as are imposed by the prior art and are set forth in the appended claims.

What is claimed as new and desired to be secured by United States Letters Patent is:

1. In a method of forming through holes in an electrically conductive and electrochemically erodible workpiece including advancing a hollow conductive electrode toward and into the workpiece while passing a low voltage, high density direct current between the workpiece and the electrode in a sense to make the workpiece anodic and the electrode cathodic and while pumping an electrolyte from at least one opening in the body of the electrode to and through the work gap between the electrode and the workpiece under high pressure and at a high velocity, the improvement which comprises placing a back pressure on the electrolyte at an exit from the work gap, feeding electrolyte at greater than atmospheric pressure to the exit from the work gap ahead of the point where the back pressure is created under such conditions that the flow of the electrolyte from the work gap is normally in one direction and through the exit but when the electrode breaks through the workpiece to the exit side there is a reverse of flow of the electrolyte in the exit so that electrolyte flows to the work gap both from the entry side and exit side thereof and exits through the hole formed in the workpiece, thereby providing the workpiece with a sharp and clean edge at the exit side and preventing the workpiece material from contacting or sticking to the electrode.

2. The method set forth in claim 1, wherein the flow of electrolyte is controlled by restricting the flow from the exit from the work gap and by restricting the by-pass flow from the source around the work gap to the exit.

3. The method set forth in claim 1, wherein the amount of back pressure created on the electrolyte flowing from the work gap is approximately half the value of the pressure on the electrolyte entering the work gap.

4. The method set forth in claim 3, wherein the pressure of the electrolyte by-passing the work gap is approximately one atmosphere.

5. In an apparatus for electrolytically forming through holes in an electrically conductive and electrochemically erodible workpiece having a hollow conductive electrode, means mounting said electrode to advance the electrode toward and into the workpiece, electric power supply means connected to pass a low-voltage, high-density direct current between the workpiece and the electrode in a sense to make the workpiece anodic and the electrode cathodic, pump means connected to supply electrolyte to the work gap between the electrode and the workpiece under high pressure and at a high velocity, an exit line connected to the work gap to conduct electrolyte therefrom, and a restriction in the exit line to place a back pressure upon the electrolyte in the work gap, the improvement which comprises a connection between the exit line upstream from the restriction therein and the electrolyte pump means, and a restriction in said connection to insure electrolyte flow therethrough in a direction only toward the exit line, whereby upon breakthrough of the electrode to the exit side of the work gap there is a drop in pressure in the electrolyte exit line and electrolyte flows from the pump means through the connection to the exit line and causes a reverse flow of electrolyte in the exit line to the work gap, thereby insuring that the bore through the hole has a sharp and clean edge at the exit side and that the workpiece material does not contact or adhere to the electrode.

6. The electrolytic cavity sinking apparatus set forth in claim 5, wherein said inlet and exit lines are interconnected by a connecting line external to and by-passing the work gap.

7. The electrolytic cavity sinking apparatus set forth in claim 5, wherein said electrolyte enters the work gap through a passage formed between the outside of said hollow electrode and an insulating bushing and exits through said hollow electrode.

8. The electrolytic cavity sinking apparatus set forth in claim 5, wherein said electrode advances vertically into said workpiece and a back stop is provided beneath said workpiece to direct the flow of electrolyte at breakthrough to the atmosphere.

References Cited
UNITED STATES PATENTS

| | | | |
|---|---|---|---|
| 3,214,360 | 10/1965 | Bender et al. | 204—224 |
| 3,271,291 | 9/1966 | Crawford et al. | 204—143 |
| 3,275,543 | 9/1966 | Williams | 204—224 |
| 3,287,246 | 11/1966 | Williams | 204—224 |
| 3,399,125 | 8/1968 | Mikoshiba et al. | 204—143 |

ROBERT K. MIHALEK, Primary Examiner

U.S. Cl. X.R.

204—224

Dedication 3,536,599.—*Lynn A. Williams*, Winnetka, Ill. ELECTROLYTIC CAVITY SINKING APPARATUS AND METHOD WITH PRESSURE MEANS FOR FORCING A MACHINED SLUG FROM THE ELECTRODE. Patent dated Oct. 27, 1970. Dedication filed Dec. 23, 1971, by the assignee, *Anocut Engineering Company*.

Hereby dedicates to the Public the portion of the term of the patent subsequent to Dec. 24, 1971.

[*Official Gazette December 5, 1972.*]